United States Patent Office

3,642,935
Patented Feb. 15, 1972

3,642,935
DIMERISATION OF OLEFINS
Robert William Dunning, Keith Andrew Taylor, and John Walker, Runcorn, England, assignors to Imperial Chemical Industries Limited, London, England
No Drawing. Filed Aug. 22, 1968, Ser. No. 754,740
Claims priority, application Great Britain, Sept. 4, 1967, 40,242/67, Patent 1,164,855
Int. Cl. C07c 3/10
U.S. Cl. 260—683.15 D                        16 Claims

ABSTRACT OF THE DISCLOSURE

Process for the oligomerisation of monoalkenes in which the monoalkene is contacted with a catalyst comprising a nickel compound, a substituted organic halophosphine and a Lewis acid. Preferably the catalyst comprises a preformed nickel complex containing an appropriate halophosphine ligand or ligands and a Lewis acid. In either case, the nickel compound or complex is preferably contacted with an olefin before addition of the Lewis acid.

---

This invention relates to improvements in oligomerisation of monoalkenes and especially to the dimerisation and co-dimerisation of such alkenes.

In particular the aforementioned applications describe a process for the oligomerisation of monoalkenes which comprises contacting the monomer with a catalyst formed from a compound of a metal of Group VIII of the Periodic Table, a ligand containing a donor atom or atoms of Group V–B of the Periodic Table and a compound capable of acting as a Lewis acid under the conditions of the process. Preferred donor atom ligands are phosphines.

As mentioned in these co-pending applications, the products of our process are suitable as a feed-stock for the well-known hydroformylation process therein an olefin or mixture of olefins is reacted with hydrogen and carbonmonoxide in the presence of a suitable catalyst, to produce the appropriate aldehydes and/or alcohols. Usually, the product is mainly aldehyde which requires a separate hydrogenation to form alcohols, commonly referred to as OXO alcohols.

One of the principal uses of such alcohols is for the production of plasticiser esters, the most desirable alcohols for this purpose being those containing unbranched or mono-branched hydrocarbon chains. However, the products of our process normally contain a mixture of unbranched, mono-branched and di-branched olefins, the distribution of these isomeric forms being dependent, inter alia, on the particular phosphine used in the catalyst. For example, with nickel catalysts the use of triphenyl phosphine gives a lower proportion; of di-branched material than does tributyl phosphine; but this advantage is offset by the fact that triphenyl phosphine is more difficult to remove from the product than is tributylphosphine.

We have now found that when certain halo-phosphines are used in conjunction with nickel catalysts according to our invention, the product generally contains a low proportion of di-branched material and that the halo-phosphines are readily removed from the product. Furthermore, many catalysts containing halo-phosphines are less susceptible to thermal decomposition than the equivalent non-halogenated phosphines, which facilitates their preparation and use.

According to the present invention a process for the oligomerisation of monoalkenes comprises contacting the monomeric alkene with a catalyst formed from (1) a nickel compound and (2) a substituted halo-phosphine of the general formula $PXR_2$ or $PX_2R$, where X is a halogen atom and R is a hydrocarbyl group, and (3) a compound which is capable of acting as a Lewis acid under the conditions of the process.

Preferably R is an aryl or substituted aryl group.

Preferred nickel compounds are those in which the metal is combined with one or more anionic ligands. Suitable compounds include salts of organic acids such as naphthenic or stearic acids or chelates such as acetylacetonates. Salts of inorganic acids may be used, particularly in their anhydrous form.

Preferred substituted halo-phosphines are diphenylchlorophosphine and phenyldichlorophosphine.

Preferred Lewis acids are aluminium compounds, for examples the trihalides, alkyl dihalides, sesquialkyl halides, dialkyl halides or trialkyls of aluminium may be used. Economic considerations favour chloride as the halide.

The catalyst may be prepared by contacting, in any order the nickel compound, phosphine and Lewis acid or may be formed in situ by adding these three components to the reaction mixture. Alternatively, the nickel compound may be pre-treated with the phosphine, when it is often possible to isolate complexes containing nickel and phosphorus combined in a convenient atomic ratio. For example nickel naphthenate gives a red complex with diphenchlorophosphine which contains nickel and phosphorus in an atomic ratio of 1:2. This complex may then be added to the Lewis acid or vice versa.

Accordingly, a further aspect of the present invention comprises a process for oligomerising monoalkenes by contacting them with a complex of nickel containing in the molecule one or more ligands comprising halophosphines of the type described above and a Lewis acid also as described above.

As examples of nickel complexes there may be mentioned $NiCl_2(PClPh_2)_2$ and $Ni(naphthenate)_2 \cdot (PClPh_2)_2$.

However, it is often advantageous to employ rather higher concentrations of phosphine than is provided by these complexes. Preferred catalysts are those containing nickel:phosphorus:aluminium in an atomic ratio from 1:2:5 up to 1:16:140. Hence where a complex is used as a component of the catalyst, additional free phosphine may be added.

As stated above, the components of the catalyst may be mixed in any order. It is, however, advantageous to add the Lewis acid after the nickel compound and phosphine components of the catalyst have been contacted with olefin.

Accordingly, a preferred process for the oligomerisation of monoalkenes comprises contacting the nickel compound halophosphine mixture or nickel complex with an olefin or mixture of olefins before or during addition of the Lewis acid compound. For the sake of simplicity this step will hereinafter be referred to as the "stabilising process."

It is often convenient to contact the said mixture or complex with the olefin or olefins which comprises the monomer, but any olefin may be used for the purpose. However, where possible one should avoid using a branched chain olefin which is liable to rapid polymerisation with the Lewis acid component, e.g. isobutene with ethyl aluminium dichloride, especially when the monoalkene which is to be oligomerised contains such an olefin.

The stabilising process may be carried out in any convenient way, for example:

(1) The nickel compound and phosphine may be mixed and treated with a gaseous or liquid olefin before or simultaneously with the addition of the Lewis acid compound.

(2) A gaseous olefin, for example ethylene or propene, may be bubbled through a solution of nickel complex before addition of the Lewis acid compound.

(3) The nickel complex may be dissolved in a liquid olefin, for example, liquid n-butene, or recycled heavy ends from subsequent dimer recovery stages, and the Lewis acid compound added to the resulting solution.

(4) The nickel complex, or nickel compound and donor atom ligand may be dissolved in a non-olefinic solvent, e.g. chlorobenzene, and a liquid olefin and a Lewis acid compound added simultaneously.

Once a stabilised catalyst mixture has been prepared by the aforementioned stabilising process, it appears to be stable for at least several hours, as indicated by the absence of discolouration or precipitation from the solution.

Monoalkenes which may be oligomerised by the process of our invention include ethylene, propene, but-1-ene and but-2-ene (cis and trans), or mixtures of the same. For example propylene may be made to yield hexenes and higher oligomers, but-1-ene to yield octenes, and mixtures of but-1-ene or but-2-enes with propylene to yield mixtures of hexenes, heptenes and octenes. However, it is found with most catalyst systems that in the co-dimerisation of propylene and n-butene, the butene should be present in excess if a satisfactory yield of co-dimer is to be obtained.

Commercially available butene streams which may be used in conjunction with propene as a feedstock in our process often contain iso-butene, and it is advantageous to remove this before reaction, since it readily forms polymers in the presence of the stronger Lewis acids.

As the process is preferably performed in the liquid phase, it is sometimes convenient to add to the reaction mixture solvent for both the monomer and catalyst. Halogenated hydrocarbon solvents may be used, for example, chlorobenzene and methylene chloride. Saturated aliphatic hydrocarbon solvents, although inert are best avoided, or at least kept in fairly low concentration, since the catalysts tend to be rather insoluble in such materials, usually less than 100 mg./litre. Aromatic solvents may be used, for example xylene.

However, the final choice of solvent will be dictated principally by the catalyst used. For example the presence of chlorobenzene enhances the activity of some of the catalysts. It is convenient to apply the process in the absence of inert solvent, e.g. by operating in liquid monomer, e.g. propene or butenes or recycled oligomer or heavy ends. Propylene tetramer is also suitable.

The process may be carried out at atmospheric pressure; but super-atmospheric conditions are preferred, especially for dihalophosphines. Pressures up to 300 atmospheres or even higher may be used. The pressure may be applied or autogenous, and final choice of pressure will depend upon the monomer/catalyst combination used. For example, pressures between 5 and 50 ats. are suitable for dimerisation of propene and butene. The reaction must be carried out under oxygen-free conditions.

The temperature of the reaction is preferably controlled between $-25°$ C. and $200°$ C. It is a further advantage of the present invention, that the catalyst activity is not so severely affected by the use of temperatures at the higher end of the preferred range. A useful economic consequence of this is that refrigeration is rendered unnecessary and removal of heat from the exothermic reaction may be achieved by the use of water cooling. The particularly preferred temperature range is 20 to $100°$ C.

The concentration of nickel in the liquid reactants will normally lie between $10^{-3}$ mmole and $10^3$ mmoles/litre and, preferably between $10^{-2}$ mmoles and 10 mmoles/litre.

The concentrations given above are calculated on the average volume of liquid reactants, since the volume increases during the reaction.

The products of our oligomerisation process may be worked up in a variety of ways. For example, (a) Oligomer may be recovered by first distilling off unconverted monomer from the crude product and then distilling the oligomer from catalyst and heavy ends which may then be recycled through the process.

(b) The catalyst may be deactivated before distillation of the crude product, or (c) The catalyst may be destroyed and then washed out of the product with an aqueous medium such as water or an aqueous oxidising medium such as hydrogen peroxide or dilute hypochlorite solution, before distillation.

(d) The catalyst may be precipitated out by addition of excess of an aliphatic saturated hydrocarbon, since it is virtually insoluble in inert saturated hydrocarbon diluents.

The process may be operated on a continuous basis using a mild steel reactor, variants such as (a) above being particularly suited to such operations. The continuous process may be applied, for example, by using an elongated reactor or a series of reactors in a cascade. This would enable the propylene in, say, a propylene/butene dimerisation to be introduced at several points along the reactor or into several reactors in series. It will be appreciated that any unreacted olefin may be recycled through the process.

It has been found that the products of our oligomerisation process require only distillation to separate unconverted monomer and heavy ends before use in a hydroformylation process. After hydrogenation of the product the derived alcohols are very suitable for the production of high quality plasticiser esters.

The invention will be illustrated by the following examples.

EXAMPLE 1

A 1 litre autoclave containing nitrogen was cooled with a solid $CO_2$/acetone mixture to about $-30°$ C. 200 ml. butene was introduced, followed by 2 ml. of a xylene solution containing nickel naphthenate ($\equiv 0.043$ mmole nickel) and phenyldichlorophosphine ($\equiv 0.688$ mmole phosphorus). The mixture was stirred and 4.4 ml. of a hydrocarbon solution containing ethyl aluminium dichloride ($\equiv 3.87$ mmoles aluminium) was added. Propylene gas was applied initially at 40 p.s.i., which was increased to about 100 p.s.i. during the experiment. A further 100 ml. butene was also added during the experiment. The temperature was maintained at $60°$ C.

At the end of 6 hours, the vessel was cooled to $-30°$ C. and discharged. 405 g. of crude product was obtained which, after distillation, yielded 183 g. of $C_{6-8}$ olefins and 14 g. of heavy ends.

The product distribution ($C_6:C_7:C_8$) was $C_6$, 56%; $C_7$, 36%; $C_8$, 8.0%. About 90% of the product consisted of mono-branched and unbranched olefins.

EXAMPLE 2

The procedure of Example 1 was repeated using diphenylchlorophosphine.

At the end of 6 hours, 385 g. of product was obtained which yield 183 g. of $C_{6-8}$ olefins and 29 g. of heavy ends.

The product distribution was $C_6$, 42%; $C_7$, 44%; $C_8$, 14%. Again about 90% of the product consisted of mono-branched and unbranched olefins.

EXAMPLE 3

50 ml. of chlorobenzene was added to a 200 ml. glass vessel fitted with a stirrer and reflux condenser. A preformed nickel complex, bis(diphenylchlorophosphine) nickel naphthenate (0.1 g.) was dissolved in the chlorobenzene under an atmosphere of nitrogen. Propylene was blown through the mixture and ethyl aluminium dichloride (0.84 g.) was introduced. The temperature, initially at $20°$ C. rose to $50°$ C. and propylene was absorbed. After 30 minutes 69.2 g. of reaction product was obtained, which yielded 14.2 g. of hexenes.

EXAMPLE 4

The procedure of Example 3 was repeated using a different preformed nickel complex, bis(diphenylchlorophosphine) nickel dichloride (0.1 g.). Under otherwise identical conditions a similar yield of hexenes was obtained.

EXAMPLES 5 AND 6

Propylene dimerisations were carried out using catalyst systems comprising (1) nickel naphthenate/phenyldichlorophosphine/e t h y l aluminium chloride.
(2) nickel naphthenate/diphenylchlorophosphine/e t h y l aluminium dichloride.

In both cases the concentrations of the catalytic species we were sufficient to give a nickel:phosphine:aluminium ratio of 1:16:90. Other conditions were solvent—xylene
temperature—20–50° C.
pressure—atmospheric
time—10 minutes At the end of this time catalyst residues were washed out with various hydrolytic and oxidative solvents.

On shaking the product with an equal volume of water hydroxyphosphines slowly entered the aqueous phase.

On shaking the product with an equal volume of 7% sodium hypochlorite solution, the catalyst was rapidly removed from the product. After 15 minutes the product was tested for phosphones (with ammonium molybdate), nickel (with dimethyl glyoxime) and aluminium (with alizarin S).

The following results were obtained

Phosphorus—less than 10 p.p.m.
Nickel—less than 5 p.p.m.
Aluminium—not detected.

When the dimerisation reaction was repeated using triphenylphosphine and the product was treated similarly, a string reaction for phosphorus was obtained.

What we claim is:

1. A process for the oligomerisation or co-oligomerisation of monoalkenes which comprises contacting the monomeric alkene with a catalyst formed from (1) a nickel compound and (2) a substituted halophosphine of the general formula $PXR_2$ or $PX_2R$ where X is a halogen atom and R is an aryl hydrocarbon group, and (3) an aluminum compound which is capable of acting as a Lewis acid under the conditions of the process and which is selected from the group consisting of aluminum trihalides, aluminum alkyl halides and aluminum trialkyls and washing the resulting product with an aqueous hypochlorite medium to remove catalyst residue therefrom.

2. A process according to claim 1 in which R is phenyl.

3. A process according to claim 1 in which the nickel compound contains at least one anionic ligand.

4. A process according to claim 3 in which the anionic ligand is naphthenate, acetylacetonate, or halide.

5. A process according to claim 2 in which the substituted halophosphine is diphenylchlorophosphine or phenyldichlorophosphine.

6. A process according to claim 1 in which the aluminum compound is ethyl aluminum dichloride, diethyl aluminum chloride or ethyl aluminum sesquichloride.

7. A process according to claim 1 in which the ratio of nickel:phosphorus:aluminum is from 1:2:5 to 1:16:140.

8. A process according to claim 1 in which the nickel compound/halophosphine mixture is in contact with an olefin or mixture of olefins during the addition of the aluminum compound.

9. A process according to claim 8 in which the olefin or mixture of olefins consists of the monomer to be oligomerised.

10. A process according to claim 1 which is carried out in chlorobenzene as a solvent.

11. A process according to claim 1 in which the reaction temperature is between 20 and 100° C.

12. A process according to claim 1 in which the monomer is propylene, butene or mixtures thereof.

13. A process according to claim 1 in which the aqueous hypochlorite medium comprises a sodium hypochlorite solution.

14. A process for oligomerising or co-oligomerising monoalkenes in which the monoalkene is contacted with (1) a complex of nickel containing in the molecule one or more ligands comprising halophosphines of the general formula $PXR_2$ or $PX_2R$ where X is halogen and R is an aryl hydrocarbon and (2) an aluminum compound which is capable of acting as a Lewis acid under the conditions of the reaction, said aluminum compound being from the group consisting of aluminum trihalides, aluminum alkyl halides and aluminum trialkyls, and washing the resulting product with an aqueous hypochlorite medium to remove catalyst residue therefrom.

15. A process according to claim 14 in which the nickel complex is $NiCl_2(PClPh_2)_2$ or $$Ni(naphthenate)_2(PClPh_2)_2$$

16. A process according to claim 14 in which the nickel complex is in contact with an olefin or mixture of olefins during the addition of the aluminum compound.

References Cited

UNITED STATES PATENTS

| | | | |
|---|---|---|---|
| 3,390,201 | 6/1968 | Drew | 260—676 |
| 3,482,001 | 12/1969 | Eberhardt | 260—683.15 |
| 3,485,881 | 12/1969 | Zuech | 260—683.15 X |
| 3,496,247 | 2/1970 | Yuguchi et al. | 260—680 |
| 3,511,891 | 5/1970 | Taylor et al. | 260—683.15 |
| 3,472,910 | 10/1969 | Favis | 260—683.15 |
| 3,513,218 | 5/1970 | Faltings et al. | 260—683.15 |

PAUL M. COUGHLAN, Jr, Primary Examiner

U.S. Cl. X.R.

252—429 B, 431 C